US007065560B2

(12) United States Patent
Erickson et al.

(10) Patent No.: US 7,065,560 B2
(45) Date of Patent: Jun. 20, 2006

(54) VERIFICATION OF COMPUTER PROGRAM VERSIONS BASED ON A SELECTED RECIPE FROM A RECIPE TABLE

(75) Inventors: Michael J. Erickson, Loveland, CO (US); Michael S. Allison, Fort Collins, CO (US); Leo J. Embry, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 664 days.

(21) Appl. No.: 10/094,617

(22) Filed: Mar. 12, 2002

(65) Prior Publication Data

US 2003/0177223 A1 Sep. 18, 2003

(51) Int. Cl.
*G06F 15/16* (2006.01)
*G06F 15/173* (2006.01)
*G06F 9/44* (2006.01)

(52) U.S. Cl. ...................... 709/219; 709/223; 709/221; 717/168

(58) Field of Classification Search ........ 709/220–226, 709/248; 717/162–177
See application file for complete search history.

(56) References Cited

U.S. PATENT DOCUMENTS 5,577,232 A * 11/1996 Priem et al. ................ 717/170
5,867,714 A * 2/1999 Todd et al. ................. 717/172
5,870,610 A * 2/1999 Beyda ........................ 717/173
6,167,567 A * 12/2000 Chiles et al. ............... 717/173
6,202,207 B1 * 3/2001 Donohue .................... 717/173
6,205,445 B1 * 3/2001 Tokuyama ................... 707/10
6,363,524 B1 * 3/2002 Loy ........................... 717/170
6,425,126 B1 * 7/2002 Branson et al. ............. 717/168
6,466,972 B1 * 10/2002 Paul et al. .................. 709/222
6,631,008 B1 * 10/2003 Aoki ......................... 358/1.15
6,658,659 B1 * 12/2003 Hiller et al. ................ 717/170
6,678,741 B1 * 1/2004 Northcutt et al. ........... 709/248
6,754,723 B1 * 6/2004 Kato ............................ 710/8
6,754,896 B1 * 6/2004 Mishra et al. .............. 717/176
6,789,215 B1 * 9/2004 Rupp et al. .................... 714/38
6,804,774 B1 * 10/2004 Larvoire et al. ............... 713/2
2002/0100036 A1 * 7/2002 Moshir et al. .............. 717/173
2002/0124245 A1 * 9/2002 Maddux et al. ............. 717/176
2002/0174264 A1 * 11/2002 Fuller et al. ................ 709/321
2003/0014744 A1 * 1/2003 Doll et al. .................. 717/170

FOREIGN PATENT DOCUMENTS

EP 1 178 402 A1 * 2/2002
WO WO 99/42924 * 8/1999

* cited by examiner

*Primary Examiner*—David Wiley
*Assistant Examiner*—Joseph E. Avellino

(57) ABSTRACT

A computer program version checking system checks at least one version of software running on a computing device including a plurality of programmable devices. A version of software running on the computing device is identified and compared to a version of the software in a recipe that is previously determined to be a correct version of the software. A determination is made as to whether the versions match.

21 Claims, 3 Drawing Sheets

144

| RECIPE | $F_1$ | $F_2...$ | $F_N$ |
|---|---|---|---|
| RECIPE 10 | $V_8$ | $V_6$ | $V_4$ |
| . | . | . | . |
| . | . | . | . |
| . | . | . | . |
| RECIPE 1 | $V_1$ | $V_1$ | $V_1$ |

210 (→ header row)
220 (columns)
230 → RECIPE 10 row
240 → RECIPE 1 row

VERIFICATION OF COMPUTER PROGRAM VERSIONS BASED ON A SELECTED RECIPE FROM A RECIPE TABLE

FIELD OF THE INVENTION

The invention is generally related to updating computer programs. More particularly, the invention is related to verifying versions of computer programs.

BACKGROUND OF THE INVENTION

The use of embedded processors is becoming a common practice in a wide range of systems. A complex server may include upwards of 70 or more processors performing different functions. For example, some processors may perform functions related to system manageability and some may be system processors running user applications. Among these processors, there may be numerous types of processors (ARM, PA-RISC, 8086, IA-32, IA64). Each type of processor will require its own firmware, because each type is essentially a different architecture. Also, some processors of the same type may be performing different functions. For example, one 8086 embedded processor monitors fans while another monitors power. These two processors would be running different firmware because they have different tasks.

The firmware that runs on each of the processors sometimes needs to be updated, for example, to incorporate enhancements or fix bugs. For processors that have access to a remote computer, such as a server accessed through a network connection, updates are typically downloaded to the processors. Updates may be downloaded to a targeted processor in a multi-processor system needing the firmware update.

When multiple processors in a system are running different versions of firmware, compatibility issues between the different versions may arise. For example, firmware running on one processor may be dependent on functions performed by firmware running on another processor in the system. Therefore, the versions of firmware running on each of the processors must be monitored to insure that the versions are compatible and that debugged versions of the firmware are currently running.

When dependencies exist between firmware running on different processors, a "recipe" (e.g., a set of versions of firmware that are compatible with each other) is required to determine what version each processor should be running for the system to function properly. For systems having a large number of processors, the process of checking the versions of firmware running on the processors against the "recipe" is tedious and is prone to error.

Conventionally, the process of checking the versions of firmware running on the processors against the "recipe" is performed manually, for example, by a system administrator running version checking and update utilities. This technique requires the administrator to know how to access the image server (i.e., the server containing the updates downloaded to the processors), what are the current versions of the firmware running on the processors, and what versions should be currently running (e.g., based on a current "recipe"). It is often very difficult for the administrator to keep up with what the latest recipe is and mistakes are often made for updates provoked by the system administrator. The likelihood of error increases for large and complex systems. Also, when a recipe is changing on a daily/weekly basis, such as during product development, the time required to maintain the system and perform software updates may be excessive.

SUMMARY OF THE INVENTION

According to an embodiment, the invention includes a method for checking at least one version of software running on a multi-programmable device system. The method comprises steps of identifying a version of software running on a programmable device in the multi-programmable device system; comparing the version to a version of the software in a recipe, wherein the version in the recipe is previously determined to be a correct version of the software; and determining whether the version of the running software matches the correct version.

BRIEF DESCRIPTION OF THE DRAWINGS

The present invention is illustrated by way of example and not limitation in the accompanying figures in which like numeral references refer to like elements, and wherein.

DETAILED DESCRIPTION OF THE INVENTION

In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to unnecessarily obscure the present invention.

Figure 1:
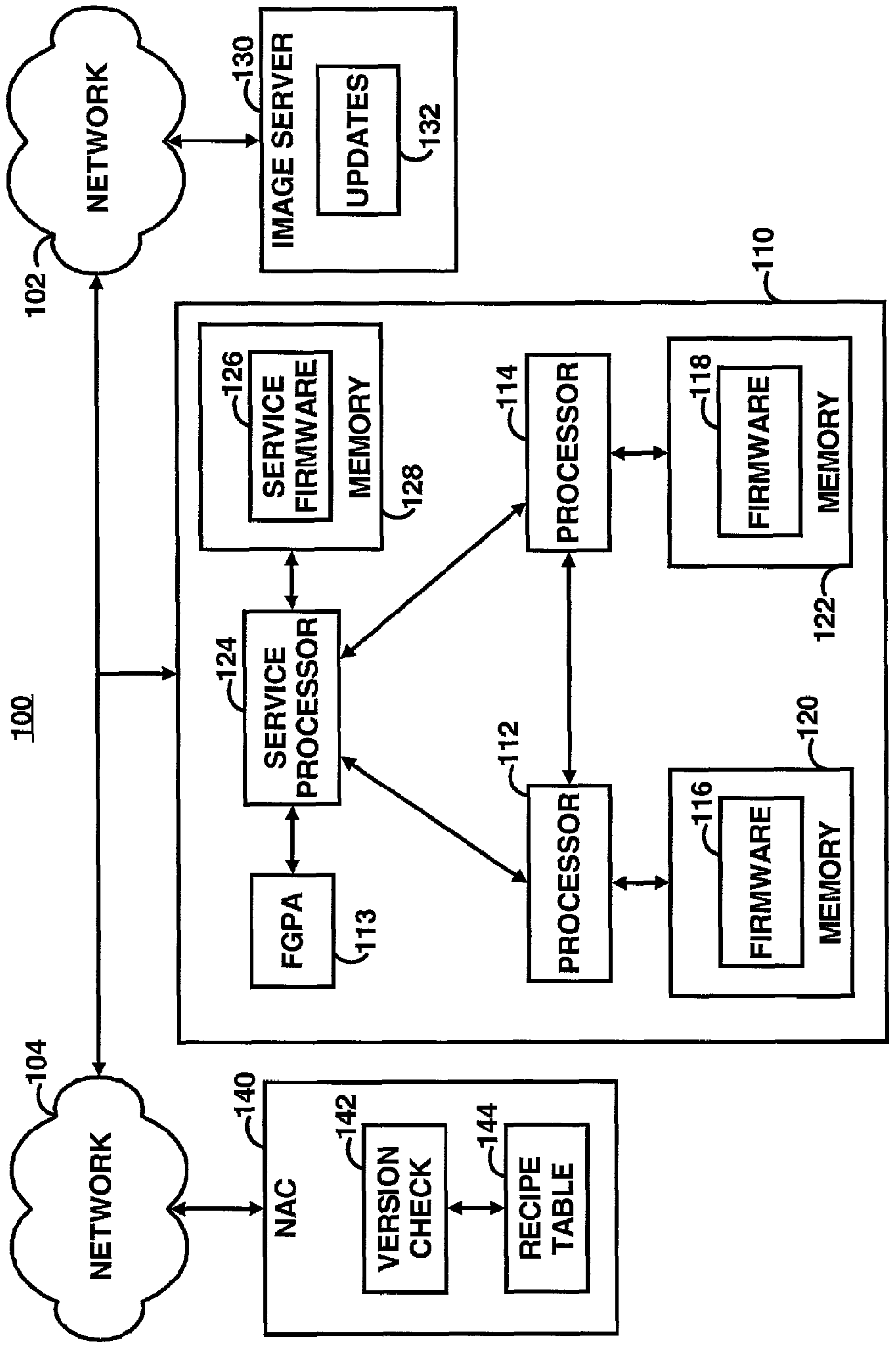
FIG. 1 illustrates a block diagram of a system, according to an embodiment of the invention.

FIG. 1 illustrates an exemplary system 100 employing principles of the invention. A computing device 110 includes multiple processors 112 and 114. The processors 112 and 114 run versions of firmware 116 and 118 respectively stored, for example, in memories 120 and 122. The computing device 110 also includes a service processor 124 running service firmware 126 stored in a memory 128. The service processor 124 determines which firmware versions the processors 112 and 114 are running. For example, the service firmware 126 running on the service processor 124 may query the processors 112 and 114 to determine which firmware versions each processor is running and/or keep track of the versions as updates are downloaded to the processors 112 and 114. It will be apparent to one of ordinary skill in the art that the computing device may include one or more of any type of programmable devices that may be updated, including but not limited to processors, field programmable arrays (FPGAs), programmable logic devices, and the like. For example, the service processor 124 may be connected to an FPGA 113 that can receive configuration instructions from a device connected to the network 102 or 104 (e.g., the image server 130) via the service processor 124. Furthermore, the computing device 110 may include a variety of devices having a programmable device, such as, but not limited to, servers, personal computers, PDAs, etc. In addition, although only three programmable devices are shown as connected to the service processor 124, the system 100 may include more than three programmable devices connected to one or more service processors.

The computing device 110 may be connected to an image server 130 via a network 102. The image server 130 may store updates 132 for firmware running on the computing device 110. The updates 132 may be transmitted to the image server 110 for storage and downloading, for example, by programmers and other authorized personnel. The updates 132 may include new versions of firmware for the processors 112 and 114. Each new version is different from a previous version and may include, for example, debugged firmware and/or firmware having new features for performing new functions. The new versions of firmware may also include configuration instructions for the FPGA 113 from the image server 130.

The computing device 110 may also be connected to a network administrator console (NAC) 140 via a network 104. The NAC 140 may run a version check software utility 142 and store recipes in a recipe table 144. A recipe in the recipe table 144 may include a list of all the versions of firmware that are compatible with each other. More than one recipe may be stored in the recipe table 144, and recipes may continually be added as new versions of firmware become available. Instead of a table, the recipes may be stored in a database or in another format.

The version check utility 142 identifies which firmware versions are running on the processors 112 and 114 in the computing device 110. For example, the version check utility 142 may transmit a request to the service processor 124 for the current firmware versions running on the processors 112 and 114. The service firmware 126 determines the current firmware versions running on the processors 112 and 114 and transmits a response to the NAC 140 including the current versions.

The version check utility 142 may check the current versions against the latest recipe in the recipe table 144. If the current versions do not match the latest recipe, then the version check utility 142 can prompt the image server 130 to download an update to a processor in the computing device 110. For example, the version check utility may transmit a request to the image server 130 requesting that the updated version from the updates 132 be transmitted to a target processor (e.g., the processor 112). The image server 130 then downloads the update to the service processor 124, and the service processor 124 updates the processor 112 with the downloaded version. The downloaded version is stored in the memory 120 as the current firmware 116.

It will be apparent to one of ordinary skill in the art that the invention is not limited to checking current versions of firmware, and the invention may check versions of any type of software, including firmware. Furthermore, version check utility may check versions of configuration instructions for programmable devices, such as the FPGA 113.

Figure 2:
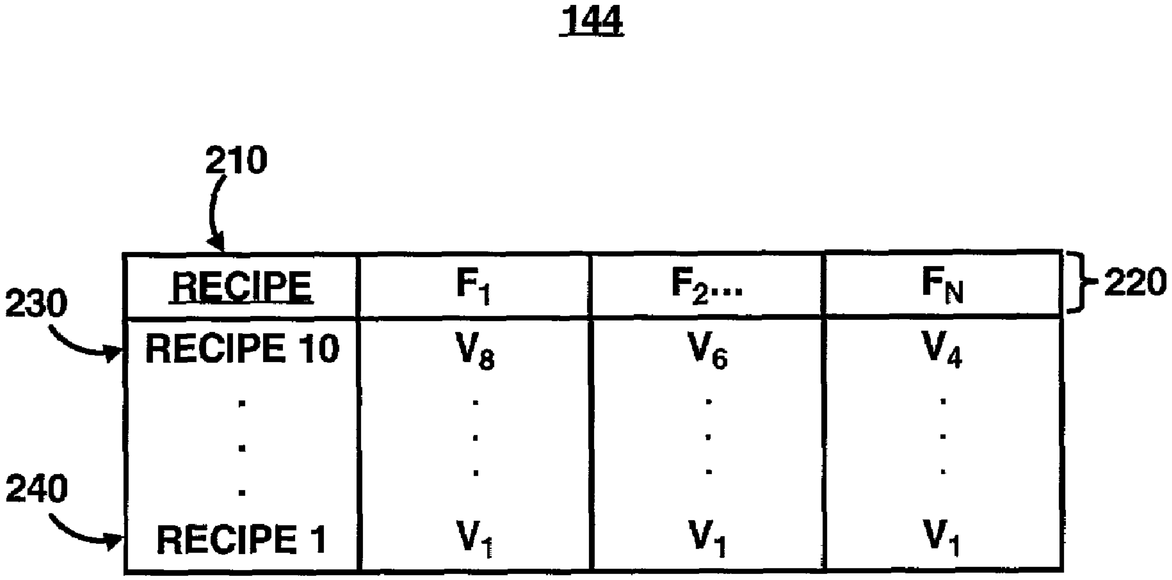
FIG. 2 illustrates a recipe table, according to an embodiment of the invention.

FIG. 2 illustrates an exemplary recipe table 144. The recipe table 144 includes a column 210 for the recipe name/version and columns 220 for the versions of firmware (F1 . . . Fn) that are dependent on each other and used together in the computing device 110. The table 144, for example, includes a row 230 for the recipe 10. The row 230 includes the versions V8, V6 and V4 for the firmware F1, F2 and Fn respectively. The row 240 for the recipe 1 may include the first versions for the firmware F1, F2 and Fn. Recipes may be published by the image server 130 after testing the versions of firmware for compatibility. The published recipe may then be downloaded by the NAC 140 or other devices that coordinate downloads of the updates 132.

Figure 3:
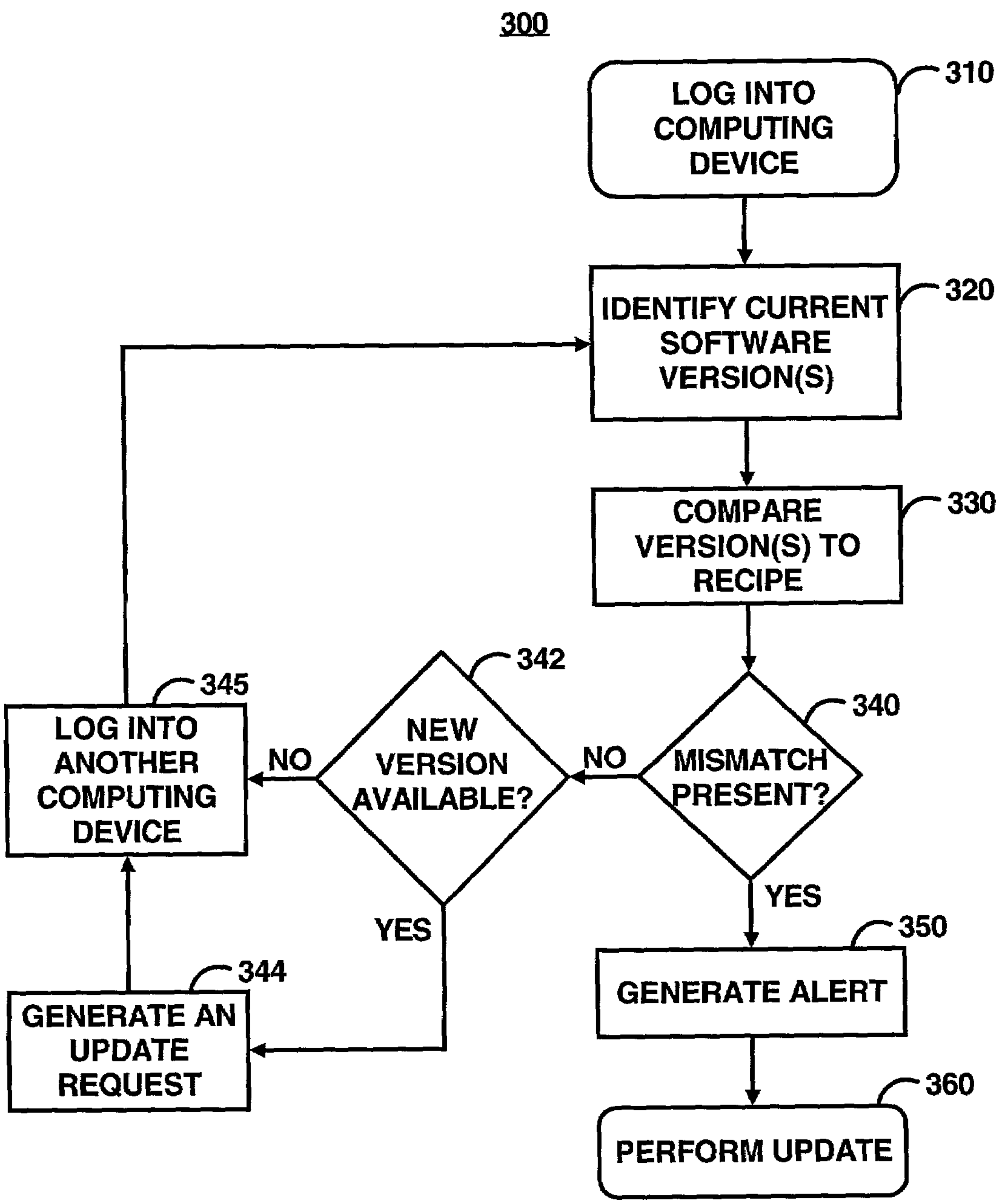
FIG. 3 illustrates a flow chart, according to an embodiment of the invention.

FIG. 3 illustrates a flow chart for an exemplary method 300 according to an embodiment of the invention. In step 310, the NAC 140 logs into the computing device 110. For example, the version check utility 142 logs into the service processor 124 in the computing device 110. FTP or other well known protocols may be used for facilitating communication between the NAC 140 and computing devices running firmware, such as the computing device 140, via the network 104 or other communication channel.

In step 320, the version check utility 142 identifies the current versions of the firmware running on the computing device 110. For example, the version check utility 142 transmits a request to the service processor 124 for the versions of firmware running on the processors 112 and 114. The service processor 124 identifies the versions in response to receiving the request, and transmits the identification of the versions to the NAC 140. To identify the versions, for example, the service processor 124 may query the processors 112 and 114 or may store the version information as the updates 132 are downloaded from the image server 130. The service processor 124 may store the version information in the memory 128 for future requests from the NAC 140.

In step 330, the versions of firmware are compared to a recipe. For example, the version check utility 142 compares to the versions identified in step 320 with a recipe stored in the recipe table 144. The recipe may be the most recent recipe in the recipe table 144 or another recipe in the recipe table 144. There may be many reasons for using a recipe other than the most recent recipe. For example, if the most recent recipe requires upgraded hardware, an older recipe that has been better tested with the older hardware may be used. Alternatively, it may be beneficial to stay one recipe behind the most recent, because the system administrator does not want to risk adopting the latest greatest recipe until it's been tried out by other customers for awhile.

In step 340, a determination is made as to whether any mismatches exist between the firmware and the recipe that the firmware is being compared to. For example, the version check utility 142 determines whether the versions of firmware running on the processors 112 and 114 are the same as the versions disclosed in the recipe.

If no mismatches are present, as determined in step 340, then no incompatibilities should exist between the firmware running on the computing device 110. Then, a determination is made as to whether a new version is available (step 342). For example, the version check utility 142 may keep track of latest versions that are still compatible with the firmware currently running, or the service processor 124 may request update information identifying latest versions of firmware.

In step 344, an update request is generated to retrieve the latest version of the firmware from, for example, the image server 130, if a new version is available. Then, the NAC 140 may proceed to log onto other computing devices (step 345), which may be connected to the network 104, to determine whether any mismatches exist between the versions of firmware running on those computing devices and the versions in a recipe. Logging onto other computing devices may be optional and may be controlled by a user. Also, in step 342, if no new version is available, then step 345 is performed.

If mismatches are present, as determined in step 340, then the NAC 140 may generate an alert (step 350) and prompt a download of the correct version of firmware from the image server 130 to the computing device 110 (step 360). The alert may be generated at the NAC 140 or at a remote location, including the computing device 110. The alert indicates that a mismatch is present. The alert may be periodically generated until notification has been provided that the mismatch has been addressed.

The NAC 140 may prompt a download of the correct versions. In one embodiment, the NAC 140 may transmit a message to the computing device 110 indicating that an incorrect version of firmware is running on the computing device 110. The message may identify which firmware is the incorrect version and may also identify which version needs to be downloaded. The service processor 124 may then download an update 132 from the image server 130 including the correct version of firmware and install the downloaded firmware for execution by a processor in the computing device 110.

In another embodiment, the NAC 140 may transmit a message to the image server 130 requesting the image server 130 to download an update to the computing device having the mismatch. For example, the NAC 140 identifies a mismatch between the firmware 116 and the recipe. The NAC 140 transmits a message to the image server 130 requesting that the correct version (such as identified from the recipe) be downloaded to the computing device 110. Then, the image server downloads an update 132 including the correct version of firmware to the service processor 124. The service processor 124 installs the downloaded firmware, which may include storing the downloaded firmware in the memory 120, and the firmware is run by the processor 112. When the NAC 140 transmits the message to the image server 130 requesting the download to the computing device 110, the NAC 140 may also transmit a message to the service processor 124 indicating that the request has been made to the image server 130. Therefore, the service processor 124 may re-request the download if the image server 130 fails to respond to the initial request within a predetermined period of time.

The method 300 is generally described with respect to firmware for processors. The method 300 is also applicable for versions of configuring instructions for configuring programmable devices, such as the FPGA 113 (shown in FIG. 2). The method 300 may be used to identify current versions of configuring instructions, compare versions to a recipe, detect mismatches and determine whether new versions are available, similarly to steps performed for versions of firmware. Configuration instruction versions and firmware versions may be stored simultaneously in a recipe.

The method 300 includes steps that can be performed by a computer program. For example, the steps that may be performed by the version check utility 142 can be embodied in a computer program. The computer program can exist in a variety of forms both active and inactive. For example, the computer program and objects can exist as firmware comprised of program instructions or statements in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of executable firmware program(s) of the computer program on a CD ROM or via Internet download. In a sense, the Internet itself, as an abstract entity, is a computer readable medium. The same is true of computer networks in general.

While this invention has been described in conjunction with the specific embodiments thereof, it is evident that many alternatives, modifications and variations will be apparent to those skilled in the art. There are changes that may be made without departing from the spirit and scope of the invention.

What is claimed is:

1. A method of checking at least one version of software running on a multi-programmable device system, the method comprising steps of:

identifying a version of software running on a programmable device in the multi-programmable device system, wherein the multi-programmable device system includes a plurality of programmable devices, each running a version of software;

selecting a recipe from a recipe table, wherein the recipe table includes a most recent recipe and at least one older recipe, each of the most recent recipe and the at least one older recipe including an identification of a set of compatible versions of the software running on the plurality of programmable devices, and the selected recipe is either the most recent recipe or an older recipe from the recipe table, wherein the plurality of programmable devices are operable to run any of the sets of versions of software identified in the most recent recipe and the older recipe for use in the multi-programmable device system;

comparing the version to a version of the software in a recipe, wherein the version in the recipe is previously determined to be a correct version of the software;

determining whether the version of the running software matches the correct version; and prompting transmission of the correct version to the programmable device in response to determining that the version of the running software does not match the correct version.

2. The method of claim 1, further comprising a step of generating an alert in response to determining the version of the running software does not match the correct version.

3. The method of claim 2, wherein the alert is generated either locally or at a remote device.

4. The method of claim 1, wherein the step of prompting further comprises transmitting a request to a remote device requesting that the correct version be transmitted to the programmable device from the remote device.

5. The method of claim 1, wherein the step of comparing further comprises comparing the versions of software running on the plurality of programmable devices to the selected recipe.

6. The method of claim 5, wherein the step of determining further comprises determining whether each of the versions matches a version in the selected recipe.

7. The method of claim 1, further comprising a step of, prior to the step of identifying, connecting to the programmable device from a remote monitoring device and performing the steps of identifying, comparing and determining at the remote monitoring device.

8. The method of claim 1, wherein the version of software running on the programmable device and the correct version are versions of one of firmware and configuration instructions for configuring a programmable device.

9. The method of claim 1, further comprising a step of determining whether a new version of the software running on the programmable device is available in response to determining the version of software running on the programmable device matches the correct version.

10. The method of claim 9, further comprising steps of:

generating a request for the new version in response to determining the new version is available; and transmitting the request to a remote device storing the new version.

11. A system comprising:

a remote monitoring device connected to a computing device having multiple programmable devices, wherein the remote monitoring device stores a plurality of recipes including a most recent recipe and at least one older recipe, each of the most recent recipe and the at least one older recipe including an identification of a set of compatible versions of the software running on the multiple programmable devices, the remote monitoring device being operable select either the most recent or an older recipe from the recipe table, wherein the multiple programmable devices are operable to run any of the sets of versions of software identified in the most recent recipe and the older recipe for use in the computing device, wherein the remote monitoring device is configured to identify a plurality of versions of software running on the multiple programmable devices and compare the plurality of versions to versions of the software in the selected recipe and previously determined to be correct versions of the software, and wherein the remote monitoring device is configured to prompt transmission of a new version of the software to one or more computing devices in response to determining that the new version is available.

12. The system of claim 11, wherein the remote monitoring device is further configured to generate an alert in response to a determination that the at least one version of the software running on a programmable device of the multiple programmable devices does not match the correct version.

13. The system of claim 11, wherein the remote monitoring device is connected to a remote computing device storing software, and the remote monitoring device is configured to transmit a request to the remote computing device prompting transmission of the correct version to the computing device from the remote computing device in response to a determination that the version does not match the correct version.

14. The system of claim 13, wherein the remote computing device includes at least one server connected to the computing device via a network, the at least one server storing a plurality of versions of software that are downloadable by the computing device.

15. The system of claim 11, wherein the remote monitoring device is a network administrator console.

16. The system of claim 11, wherein the computing device further includes a service processor configured to identify the versions of software running on the programmable devices and configured to transmit a message to the remote monitoring device identifying the versions of software running on the programmable devices.

17. The system of claim 11, wherein the plurality of versions and the correct versions are versions of one of firmware and configuration instructions for configuring a programmable device.

18. A computer readable medium on which is embedded a program, the program performing a method of checking at least one version of software running on a multi-programmable device system, the method comprising steps of:

identifying a version of software running on each of a plurality of programmable devices in the multi-programmable device system;

selecting a recipe from a recipe table, wherein the recipe table includes a most recent recipe and at least one older recipe, each of the most recent recipe and the at least one older recipe including an identification of a set of compatible versions of the software running on the plurality of programmable devices, and the selected recipe is either the most recent recipe or an older recipe from the recipe table, wherein the plurality of programmable devices are operable to run any of the sets of versions of software identified in the most recent recipe and the older recipe for use in the multi-programmable device system;

comparing the versions of software running on the plurality of programmable devices to versions of the software in a the selected recipe, wherein the versions in the selected recipe are previously determined to be correct versions of the software;

determining whether the versions of the running software match the correct versions; and for each of the plurality of programmable devices, prompting transmission of the correct version to the programmable device in response to determining the version of the running software does not match the correct version.

19. The computer readable medium of claim 18, wherein the method further comprises a step of generating an alert indicating a mismatch is detected in response to determining at least one of the versions of the running software does not match the correct version.

20. A computer system for checking at least one version of software running on a computing device, the system comprising:

means for identifying at least one version of software running on the computing device; wherein the computing device system includes a plurality of programmable devices, each running a version of the versions of software;

means for comparing the versions of software running on the plurality of programmable devices to versions of the software in a recipe, wherein each of the versions in the recipe are previously determined to be a correct version of the software, and the recipe is selected from a recipe table, wherein the recipe table includes a most recent recipe and at least one older recipe, each of the most recent recipe and the at least one older recipe including an identification of a set of compatible versions of the software running on the plurality of programmable devices, and the recipe is either the most recent recipe or an older recipe from the recipe table, wherein the plurality of programmable devices are operable to run any of the steps of versions of software identified in the most recent recipe and the older recipe for use in the computing device;

means for determining whether the versions of software running on the plurality of programmable devices matches the correct versions; and means for prompting transmission of the correct version to the programmable device in response to determining the version of the running software does not match the correct version for each programmable device.

21. The computer system of claim 20, further comprising means for generating an alert indicating a mismatch is detected in response to determining at least one version does not match the correct version.

* * * * *

UNITED STATES PATENT AND TRADEMARK OFFICE

CERTIFICATE OF CORRECTION

PATENT NO. : 7,065,560 B2
APPLICATION NO. : 10/094617
DATED : June 20, 2006
INVENTOR(S) : Michael J. Erickson et al.

It is certified that error appears in the above-identified patent and that said Letters Patent is hereby corrected as shown below:

In column 6, line 10, in Claim 1, after “comprising” insert -- the --.

In column 6, line 28, in Claim 1, after “software in” delete “a” and insert -- the selected --, therefor.

In column 7, line 15, in Claim 11, after “recent” insert -- recipe --.

In column 7, line 22, in Claim 11, delete “programmable” and insert -- programming --, therefor.

In column 7, line 32, in Claim 12, after “that” delete “the”.

In column 8, line 15, in Claim 18, after “software in” delete “a”.

In column 8, line 33, in Claim 20, after “identifying” delete “at least one version” and insert -- versions --, therefor.

In column 8, line 34, in Claim 20, after “device” delete “;” and insert -- , --, therefor.

In column 8, line 52, in Claim 20, delete “steps” and insert -- sets --, therefor.

Signed and Sealed this

Thirty-first Day of March, 2009

JOHN DOLL
*Acting Director of the United States Patent and Trademark Office*